US009413078B2

(12) United States Patent
Leiba et al.

(10) Patent No.: US 9,413,078 B2
(45) Date of Patent: Aug. 9, 2016

(54) MILLIMETER-WAVE SYSTEM WITH BEAM DIRECTION BY SWITCHING SOURCES

(71) Applicant: Siklu Communication Ltd., Petach-Tikva (IL)

(72) Inventors: Yigal Leiba, Holon (IL); Boris Maysel, Rehovot (IL)

(73) Assignee: Siklu Communication Ltd., Petach-Tikva (IL)

( * ) Notice: Subject to any disclaimer, the term of this patent is extended or adjusted under 35 U.S.C. 154(b) by 588 days.

(21) Appl. No.: 13/918,978

(22) Filed: Jun. 16, 2013

(65) Prior Publication Data

US 2014/0368384 A1 Dec. 18, 2014

(51) Int. Cl.

| | |
|---|---|
| ***H04B 7/00*** | (2006.01) |
| ***H01Q 3/00*** | (2006.01) |
| ***H01Q 19/06*** | (2006.01) |
| ***H01Q 19/15*** | (2006.01) |
| ***H01Q 25/00*** | (2006.01) |

(52) U.S. Cl.

CPC ............. *H01Q 19/062* (2013.01); *H01Q 19/15* (2013.01); *H01Q 25/007* (2013.01)

(58) Field of Classification Search

CPC ................................. H04W 16/28; H04B 7/10
USPC ............ 342/81, 154, 367, 373, 374; 343/761, 343/779, 781 P
See application file for complete search history.

(56) References Cited

U.S. PATENT DOCUMENTS

| | | | |
|---|---|---|---|
| 3,914,768 A | 10/1975 | Ohm | |
| 4,115,782 A | 9/1978 | Han et al. | |
| 4,929,956 A * | 5/1990 | Lee | H01Q 3/2676 342/376 |
| 4,933,682 A | 6/1990 | Vaughan | |
| 6,169,910 B1 | 1/2001 | Tamil et al. | |
| 6,262,689 B1 * | 7/2001 | Yamamoto | H01Q 3/20 343/781 P |
| 6,522,437 B2 | 2/2003 | Presley et al. | |
| 6,650,281 B2 | 11/2003 | Caille et al. | |
| 7,006,053 B2 | 2/2006 | Zigler et al. | |
| 7,119,758 B2 | 10/2006 | Louzir et al. | |
| 7,233,299 B2 | 6/2007 | Thevenot et al. | |
| 7,800,549 B2 | 9/2010 | Rebeiz et al. | |
| 8,193,994 B2 | 6/2012 | Alamouti et al. | |
| 2002/0105476 A1 | 8/2002 | Overton | |
| 2002/0164946 A1 | 11/2002 | Olsen et al. | |
| 2006/0068719 A1 | 3/2006 | Hairapetian | |
| 2009/0027268 A1 | 1/2009 | Coward | |
| 2010/0214150 A1 | 8/2010 | Lovberg et al. | |
| 2012/0076217 A1 | 3/2012 | Kirshenbaum et al. | |

(Continued)

OTHER PUBLICATIONS

International search report of PCT/IL2014/050420, date of mailing Nov. 6, 2014.

(Continued)

*Primary Examiner* — Dao Phan
(74) *Attorney, Agent, or Firm* — Active Knowledge Ltd.

(57) ABSTRACT

Various embodiments of a millimeter-wave wireless point-to-point or point-to-multipoint communication system which enables determining preferred directions of transmissions, and transmitting in such preferred directions without routing radio-frequency signals. The system comprises a millimeter-wave focusing element, multiple millimeter-wave antennas, and multiple radio-frequency-integrated circuits ("RFICs"). In various embodiments, preferred directions are determined, and millimeter-wave beams are transmitted in the preferred directions.

19 Claims, 13 Drawing Sheets

(56) References Cited

U.S. PATENT DOCUMENTS

| | | | |
|---|---|---|---|
| 2012/0146827 A1 | 6/2012 | Reitmeier et al. | |
| 2012/0256796 A1 | 10/2012 | Leiba | |
| 2014/0227966 A1* | 8/2014 | Artemenko .......... | H01Q 1/1257 455/9 |

OTHER PUBLICATIONS

Written opinion of international searching authority of PCT/IL2014/050420, date of mailing Nov. 6, 2014.

* cited by examiner

MILLIMETER-WAVE SYSTEM WITH BEAM DIRECTION BY SWITCHING SOURCES

BACKGROUND

Current millimeter wave systems use several architectures for electronically controlling beam directions. Some architectures include beam-forming networks such as rotman lenses, butler matrices, and blass matrices, all of which are: (i) highly ineffective in converting millimeter-wave signals into millimeter-wave radiation, and (ii) complex/expensive to manufacture. Other architectures include phased-array radiating element, which are more effective in converting millimeter-wave signals into millimeter-wave radiation, but are prohibitively complex/expensive to manufacture, especially when high-gain beams are required. Still other architectures include a complex network of waveguides or transmission-lines operative to route millimeter-wave radiation from a single millimeter-wave radiating source to an array of distant antennas or focal surface locations, thereby causing significant signal attenuation along the way.

SUMMARY

Described herein are systems and methods in millimeter-wave wireless communication networks, wherein the network is built/configured in such a manner as to place antennas close to radio-frequency-integrated-circuits ("RFICs") such that RF signal loss is reduced, thereby leading to a superior output power at any given level of power from the RFIC. The antennas and RFICs are placed at different locations on a focal surface of a millimeter-wave lens or millimeter-wave reflector, such that the system is able to transmit or receive millimeter-wave radiation in several directions, each direction associated with one of the antennas and RFICs. The term "millimeter-wave focusing element" is used herein to refer to any millimeter-wave focusing element such as a millimeter-wave lens, a millimeter-wave concave reflector, a millimeter-wave parabolic reflector, or any other millimeter-wave focusing element for which a focal surface exists.

One embodiment is a millimeter-wave communication system that operates to direct millimeter-wave signals from specific transmitters to specific antennas. In one particular form of such an embodiment, the system includes a millimeter-wave focusing element that operates to focus millimeter-wave beams, multiple millimeter-wave transmitter antennas placed at different locations on a focal surface of the millimeter-wave focusing element, and multiple RFICs placed in association with the antennas such that (i) each of the antennas has at least one RFIC located within close proximity, and (ii) each of such antennas operates to receive a millimeter-wave signal from an RFIC in close proximity to the antenna. In this particular form of such an embodiment, the system is further operative to (i) select which one of the antennas shall transmit the millimeter-wave beam to the millimeter-wave focusing element, and then (ii) direct to such antenna the millimeter-wave signal from an RFIC located in close proximity to such antenna, thereby generating a millimeter-wave beam in a desired direction.

One embodiment is a method for controlling a direction of a millimeter-wave beam in a point-to-point millimeter-wave communication system. In some embodiments, (i) a first millimeter-wave radiating source, located at a first location on a focal surface of a millimeter-wave focusing element, transmits a millimeter-wave beam via the millimeter-wave focusing element, wherein the direction of the beam is from a specific direction determined by the location of the antenna on the focal surface, (ii) the system determines a desired direction for the beam, such that the direction will improve the performance of the system, (iii) the system identifies a second millimeter-wave radiating source, located at a second location on the focal surface, for transmitting a second direction of the millimeter-wave beam, and (iv) the second millimeter-wave radiating source transmits the millimeter-wave beam in the second direction, thereby improving the performance of the system.

One embodiment is a method for directing millimeter-wave beams in a point-to-point millimeter-wave communication system. In some embodiments, (i) the system determines a direction toward which a millimeter-wave beam is to be transmitted, (ii) the system identifies, from multiple millimeter-wave antennas placed at different points on a focal surface of a millimeter-wave focusing element, an antenna which is best placed relative to a focal point of the millimeter-wave focusing element to facilitate transmission of the beam in the determined direction, and (iii) a first RFIC located in proximity to the identified antenna generates a millimeter-wave signal which is delivered to the identified antenna, allowing the identified antenna to transmit the beam in the determined direction.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

In this description, "close proximity" or "close" means (i) that an RFIC and an antenna suited physically close to one another, to within at most 5 wavelengths of a millimeter-wave signal generated by the RFIC and (ii) at the same time, this particular RFIC and this particular antenna are connected either by direct connection, or by a transmission line, or by wire bonding, or by some other structure that allows efficient transport of the millimeter-wave signal between the two.

In this description communication between a transmitter and a receiver has been "disrupted" when the signal to noise ratio between the two has fallen to a level which is too low to support previously used modulation and coding schemes, due to one or more of a number of causes, including physical movement of the transmitter, physical movement of the receiver, physical movement of both the transmitter and the receiver, physical movement of other components of the system, other physical obstacles, or other radio frequency interference ("RFI").

In this description, to say that "radiating sources are on the focal surface" means that a millimeter-wave focusing element has a focal surface, and each radiating source is located either on that surface or directly behind it.

FIGS. 1A, 1B, 1C, 2A, 2B, 3A, and 3B, inclusive, illustrate various embodiments of radiating sources in a millimeter-wave point-to-point or point-to-multipoint communication system.

Figure 1A:
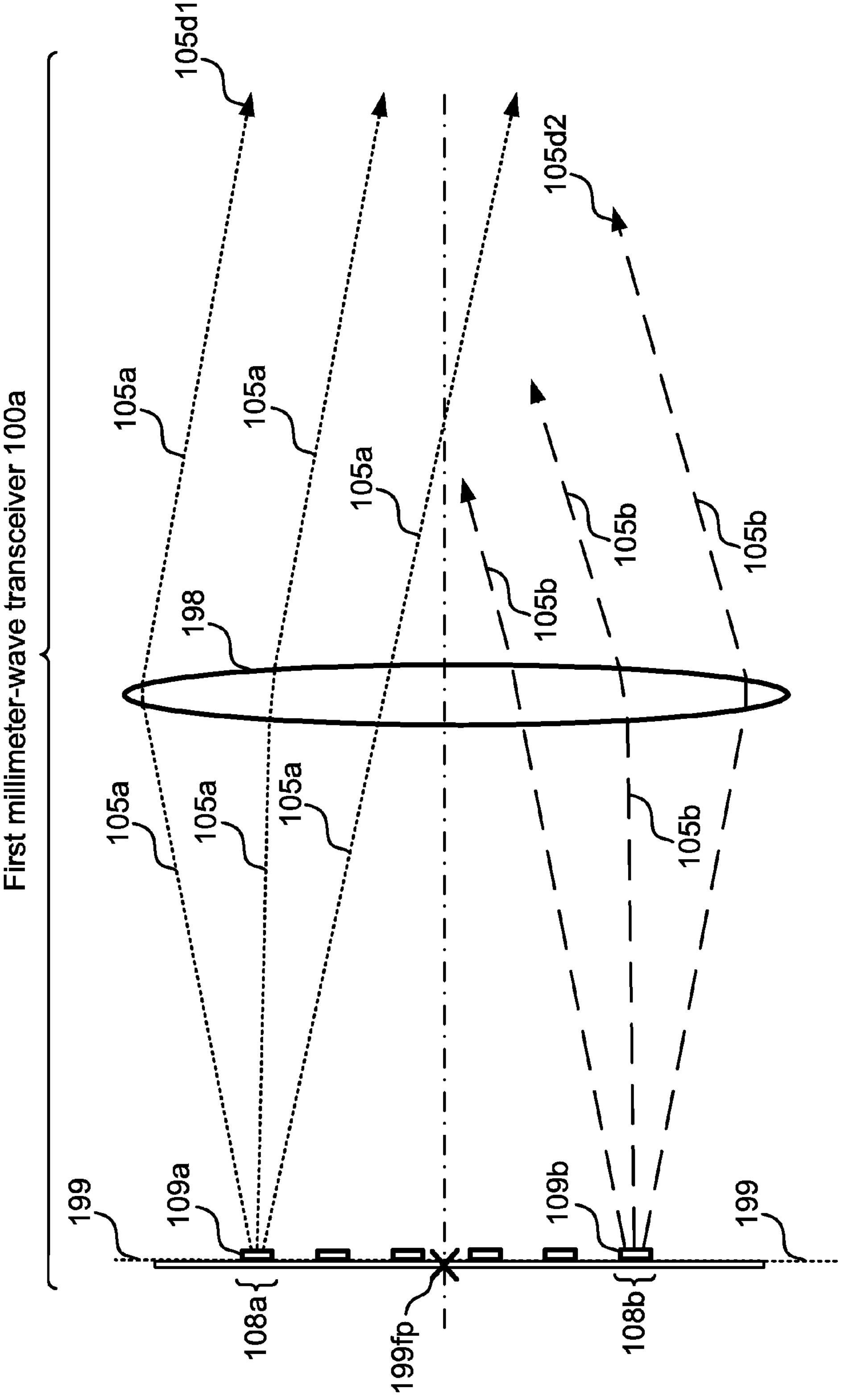
FIG. 1A illustrates one embodiment of radiating sources, placed as part of a first millimeter-wave transceiver with a millimeter-wave focusing element.

FIG. 1A illustrates one embodiment of radiating sources, placed as part of a first millimeter-wave transceiver with a millimeter-wave focusing element. A first millimeter-wave transceiver 100*a* is illustrated, which is one part of a point-to-point or point-to-multipoint millimeter-wave communication system, as shown in element 100*a* of FIG. 3A. At least two radiating sources, probably antennas coupled to RF signal sources, wherein said antennas may be printed antennas, and the radiating sources are located on the focal surface 199 of the system. In FIG. 1A, six such sources are illustrated, but only 109*a* and 109*b* are numbered. As described above, in alternative embodiments, there may be two sources only, or any number greater than two radiating sources. Radiating sources 109*a* and 109*b* are located on the focal surface 199 at locations 108*a* and 108*b*, respectively. The radiating sources radiate millimeter-wave beams, shown in an exemplary manner as first millimeter-wave beam 105*a* directed to millimeter-wave focusing element 198 toward first direction 105*d*1, and as second millimeter-wave beam 105*b* directed to millimeter-wave focusing element 198 toward second direction 105*d*2. It is noted that three rays are illustrated per each millimeter-wave beam for illustration purposes only.

Figure 3A:
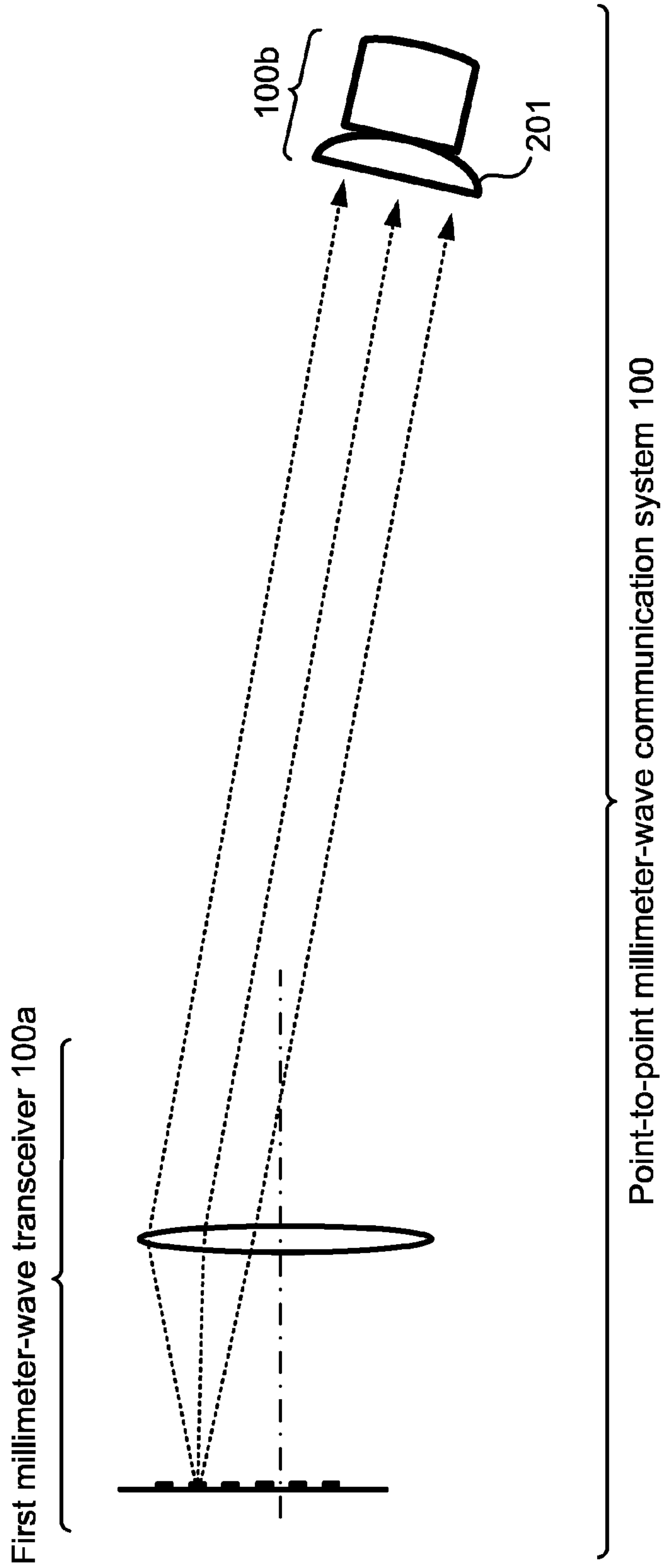
FIG. 3A illustrates one embodiment of a point-to-point millimeter-wave communication system, in which there is communication between a transmitter and a receiver.
Figure 3B:
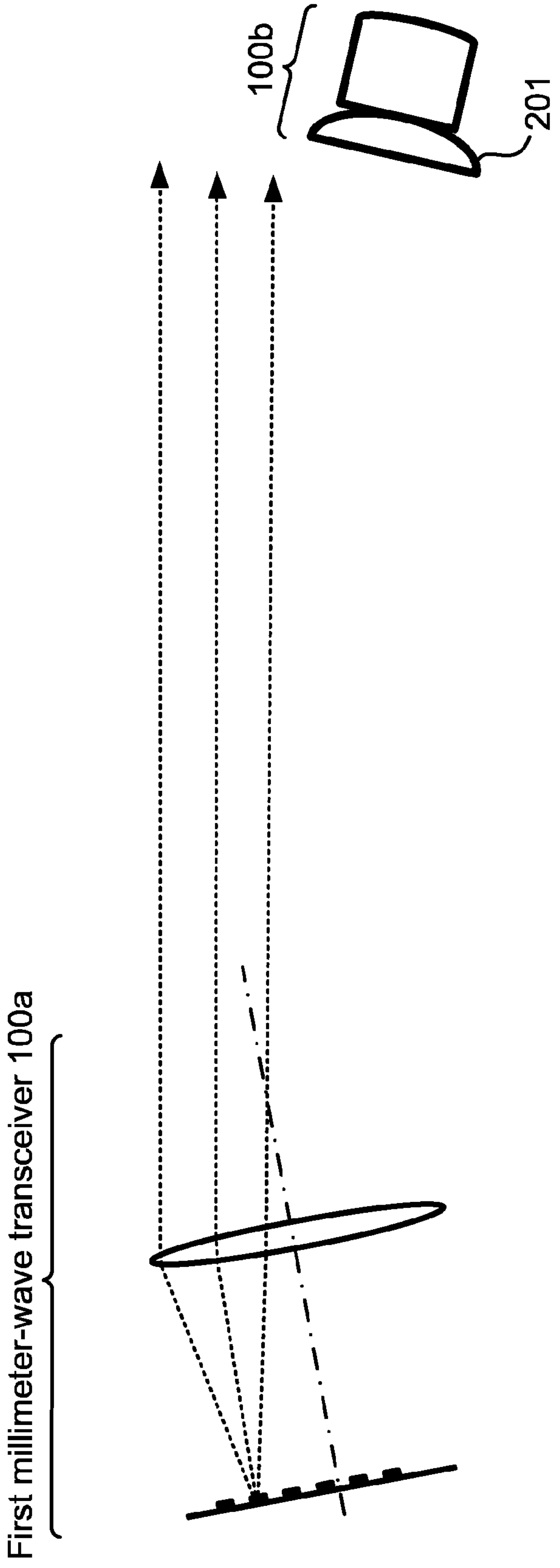
FIG. 3B illustrates one embodiment of a point-to-point millimeter-wave communication system, in which communication between a transmitter and a receiver has been disrupted.
Figure 3C:
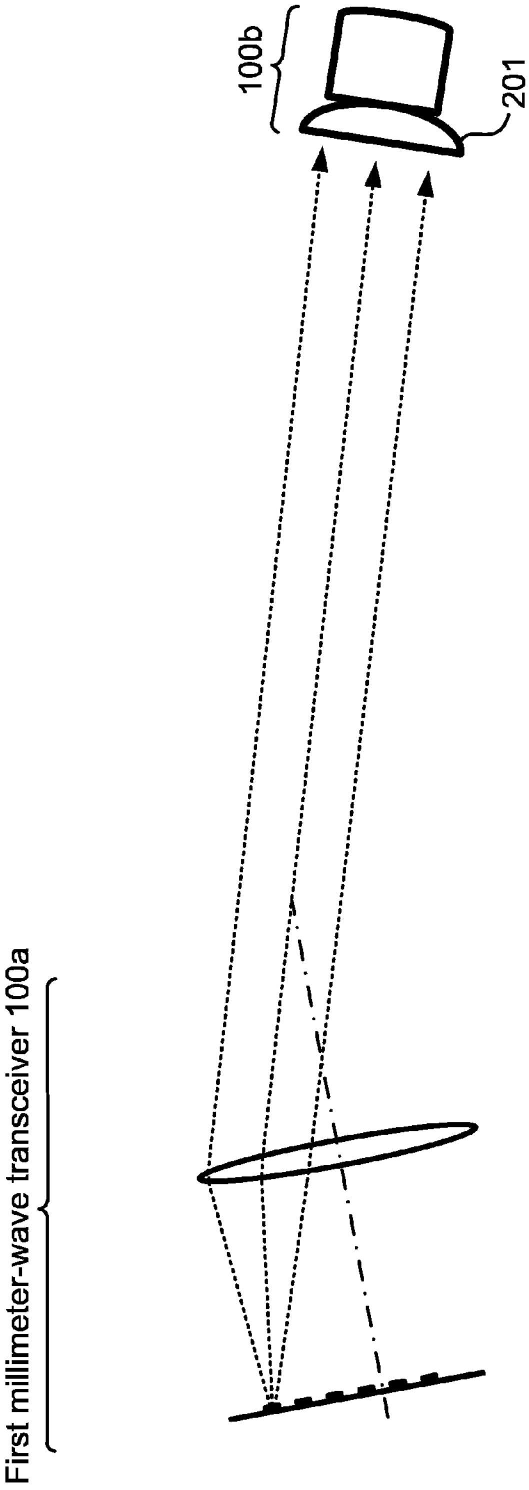
FIG. 3C illustrates one embodiment of a point-to-point millimeter-wave communication system, in which communication between a transmitter and a receiver has been restored.

It will be understood that the system illustrated in FIG. 1A is a lens 198 system, in which millimeter-wave beams travel through the lens 198 toward a location on the opposite side of the lens 198 from the focal surface 199. However, the system would operate in the same manner if element 198 were a concave or parabolic reflector designed so that the millimeter-waves reflect off the reflector toward a location on the same side of the reflector as the focal surface 199; this configuration is illustrated in FIG. 1E, in which millimeter-wave focusing element 198 is a reflector. Thus, in all the embodiments, element 198 may be a lens or a reflector. In FIGS. 3A, 3B, and 3C, the element is shown as a lens, but it could also function as a reflector, in which case the millimeter-wave beams would bounce back from the reflector toward the focal surface. Each radiating source includes at least an RF signal source (such as RFIC) and at least an antenna, such that the distance between these components is very small, which means that the radio frequency ("RF") signal loss from the RFIC to the antenna is very small.

Figure 1B:
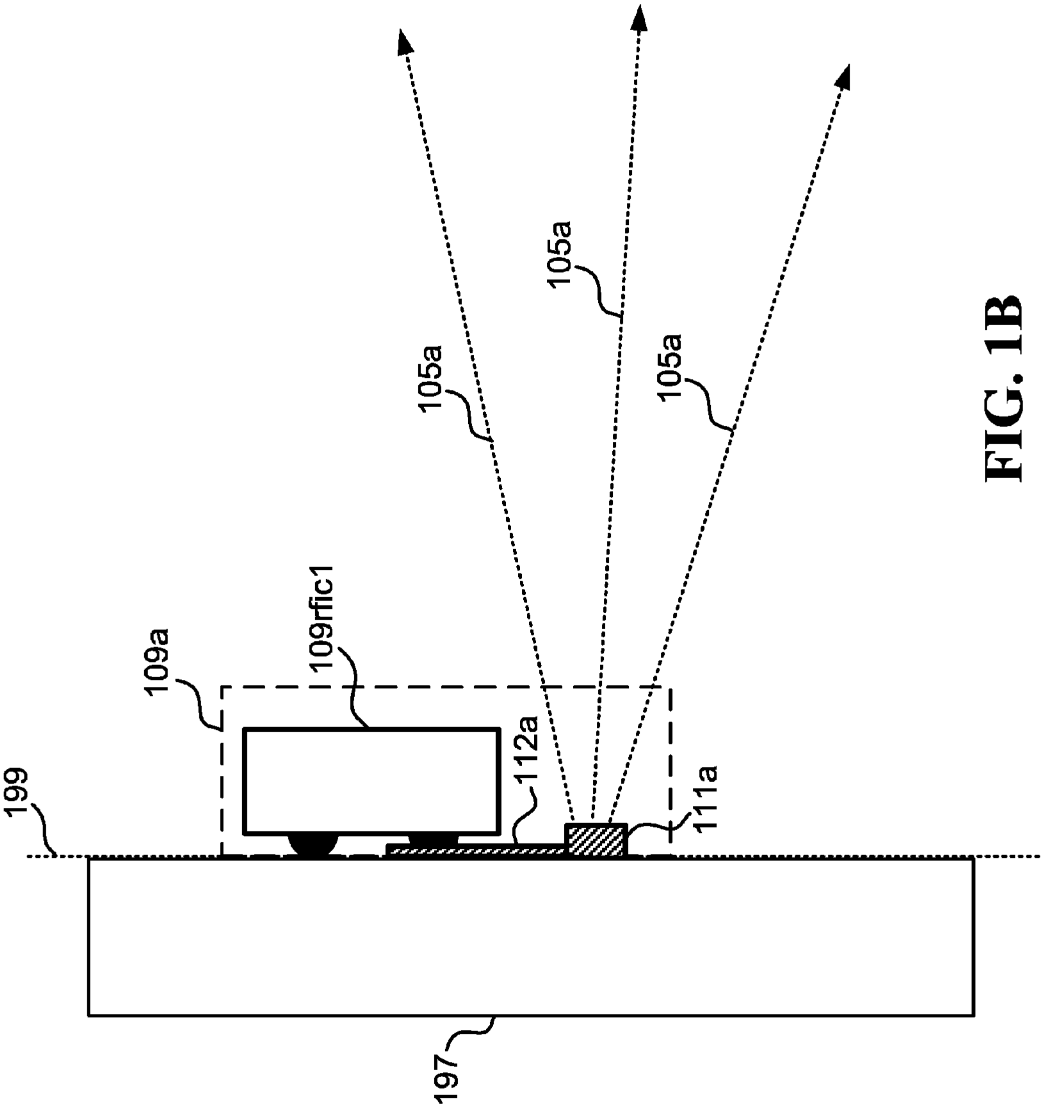
FIG. 1B illustrates one embodiment of a radiating source in a millimeter-wave communication system.

FIG. 1B illustrates one embodiment of a radiating source in a millimeter-wave communication system. In FIG. 1B, the radiating source 109*a* is mounted on a PCB 197, which is located on the focal surface 199. An RFIC 109*rfic*1 generates a millimeter-wave signal, which is conveyed via a transmission line 112*a* printed on the PCB 197 to an antenna 111*a*, which then transmits a millimeter-wave beam 105*a*.

Figure 1C:
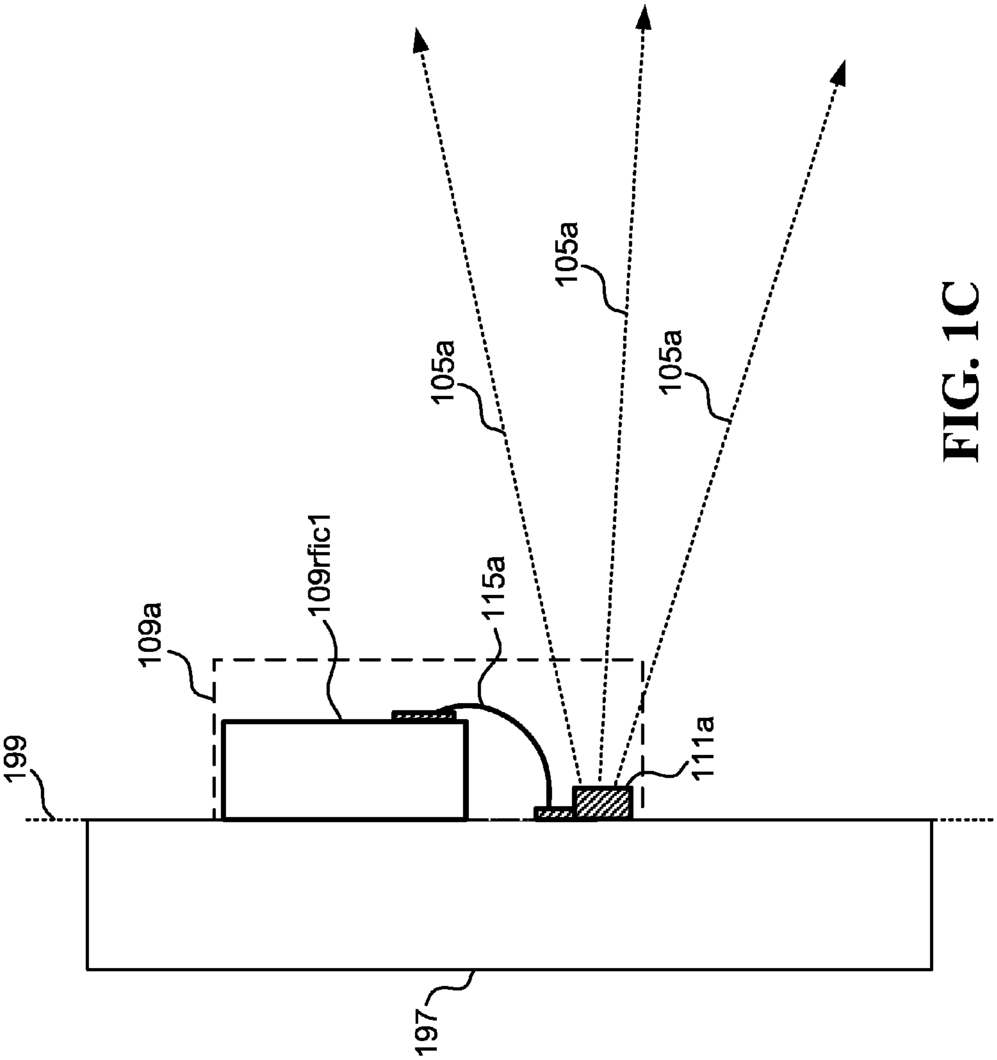
FIG. 1C illustrates one embodiment of a radiating source in a millimeter-wave communication system.

FIG. 1C illustrates an alternative embodiment of a radiating source in a millimeter-wave communication system. Instead of a transmission line 112*a* as illustrated in FIG. 1B, there is instead a wire bonding connection 115*a* that connects the RFIC 109*rfic*1 to the antenna 111*a*.

Figure 1D:
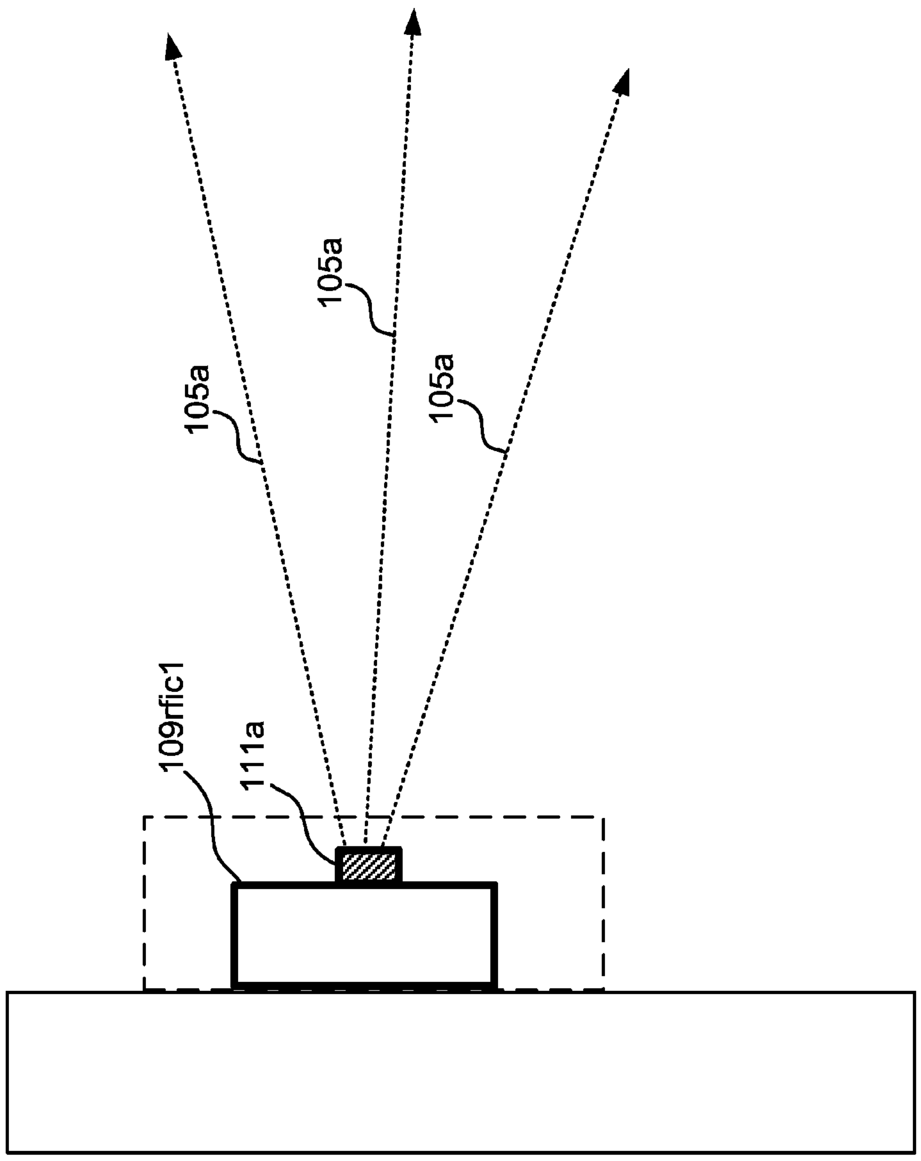
FIG. 1D illustrates one embodiment of a radiating source in a millimeter-wave communication system.
Figure 1E:
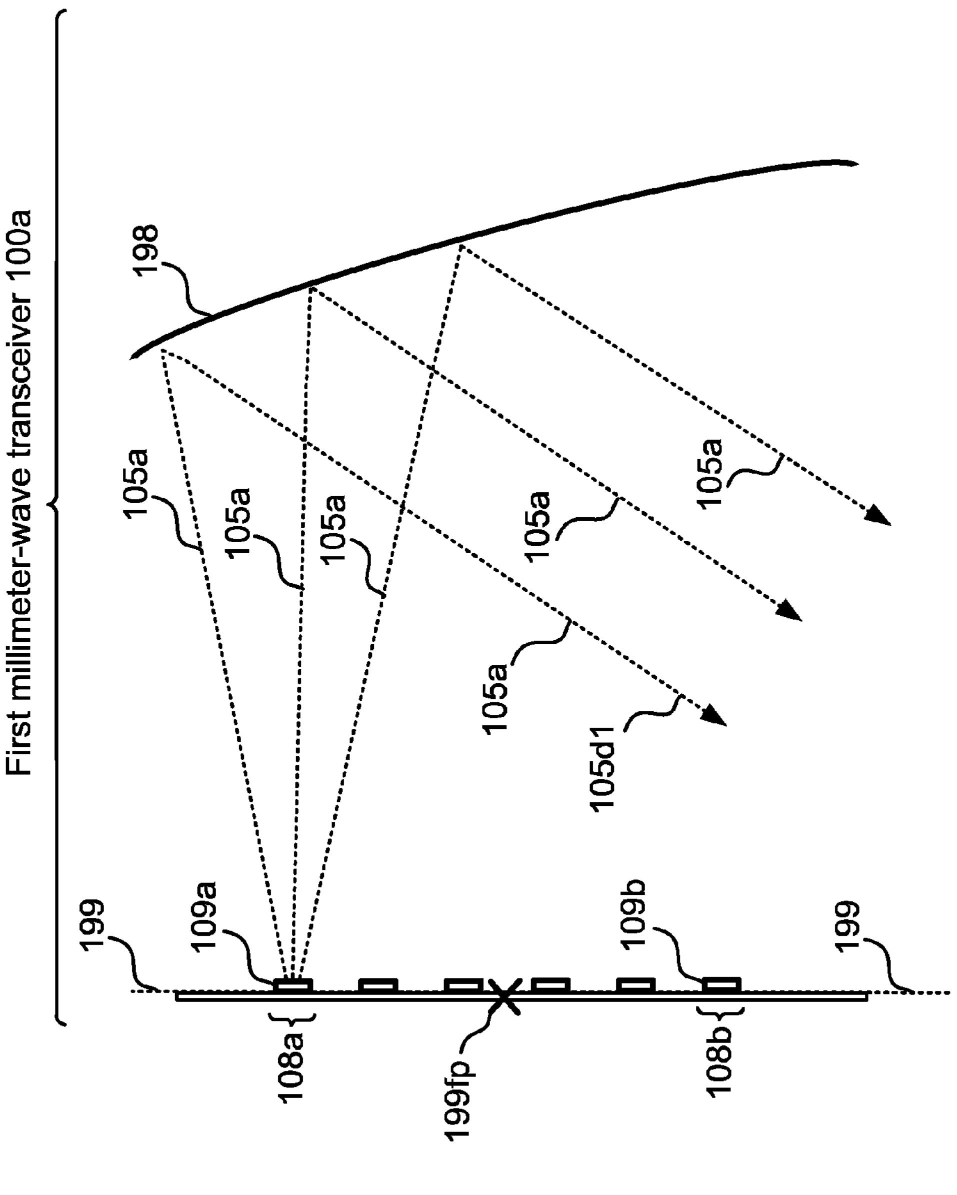
FIG. 1E illustrates one embodiment of radiating sources, placed as part of a first millimeter-wave transceiver with a millimeter-wave focusing element.

FIG. 1D illustrates an alternative embodiment of a radiating source in a millimeter-wave communication system. Here there is neither a transmission line 112*a* nor a wire bonding connection 115*a*. Rather, the antenna 111*a* is glued, soldered, or otherwise connected directly, to the RFIC 109*rfic*1.

Figure 2A:
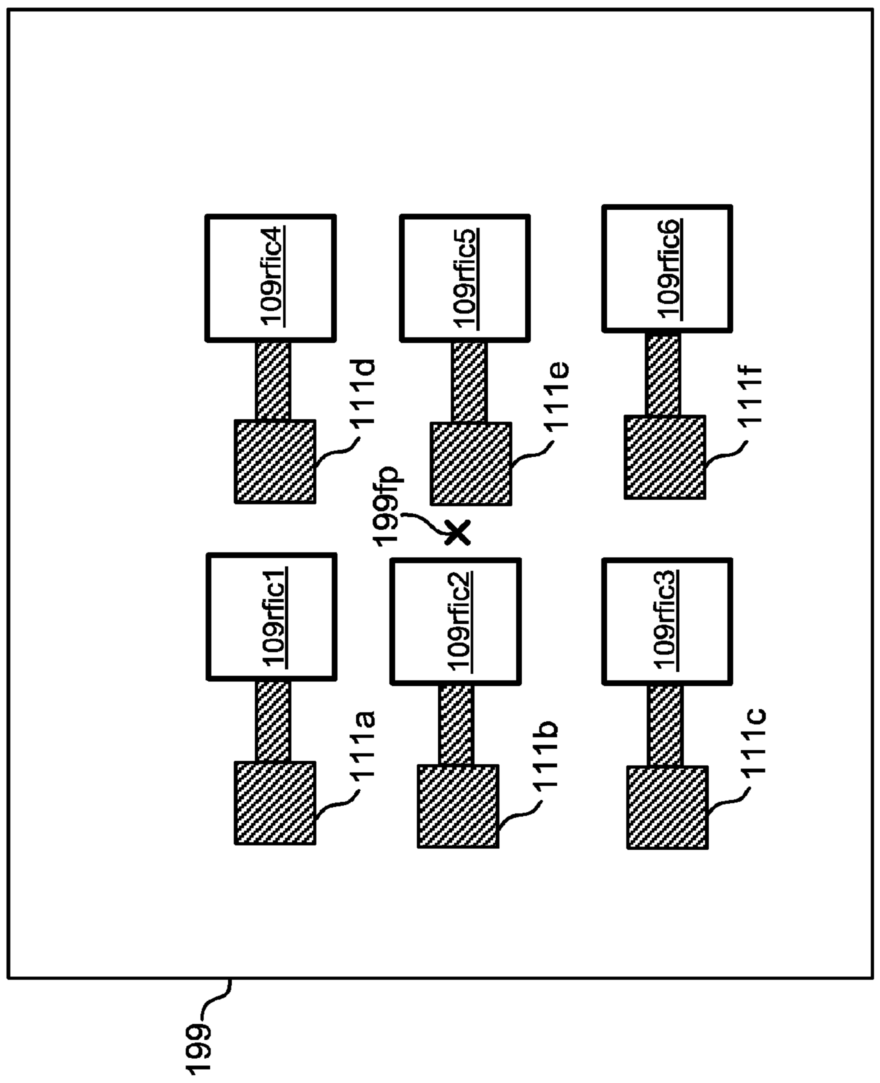
FIG. 2A illustrates one embodiment of a set of antennas on a focal surface of a millimeter-wave focusing element in proximity to various RFICs.
Figure 2B:
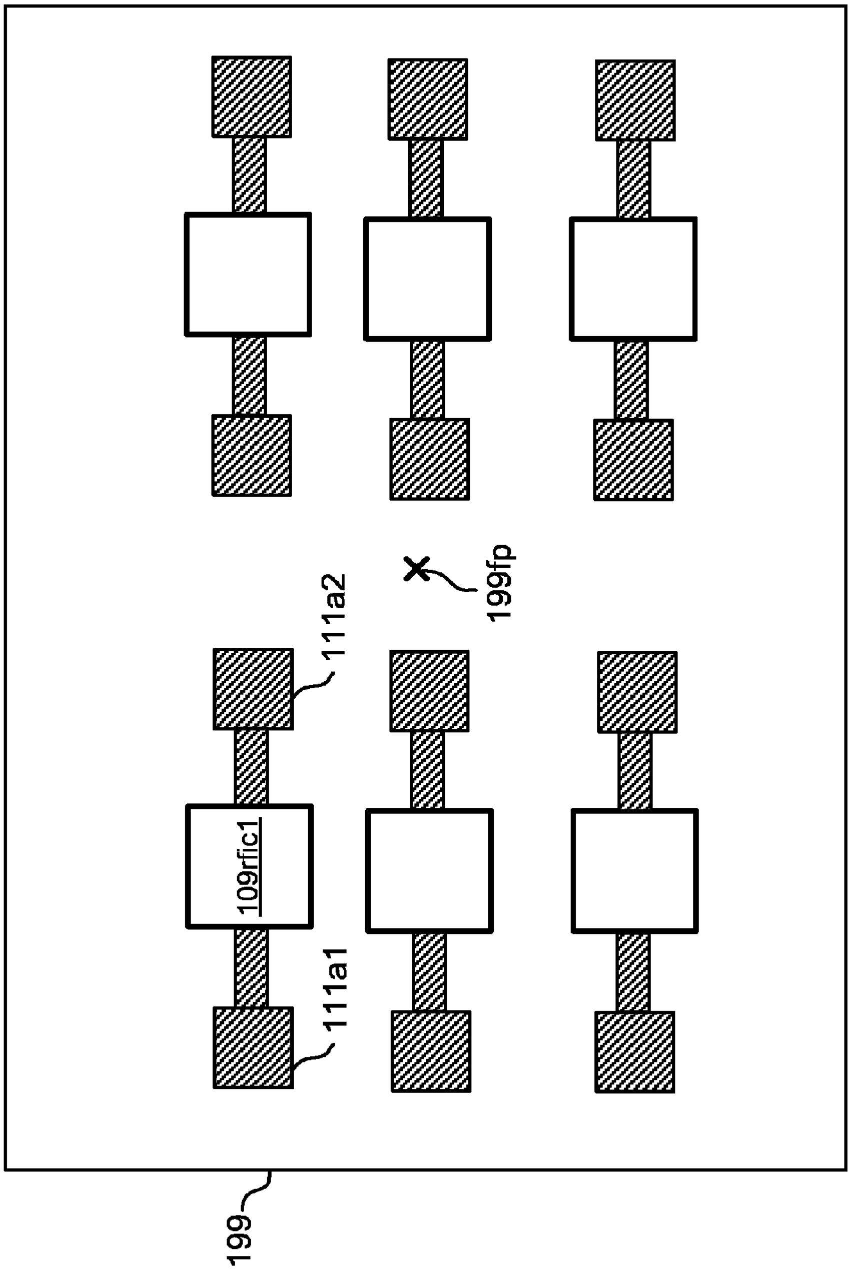
FIG. 2B illustrates one embodiment of a set of antennas on a focal surface of a millimeter-wave focusing element in proximity to various RFICs.
Figure 2C:
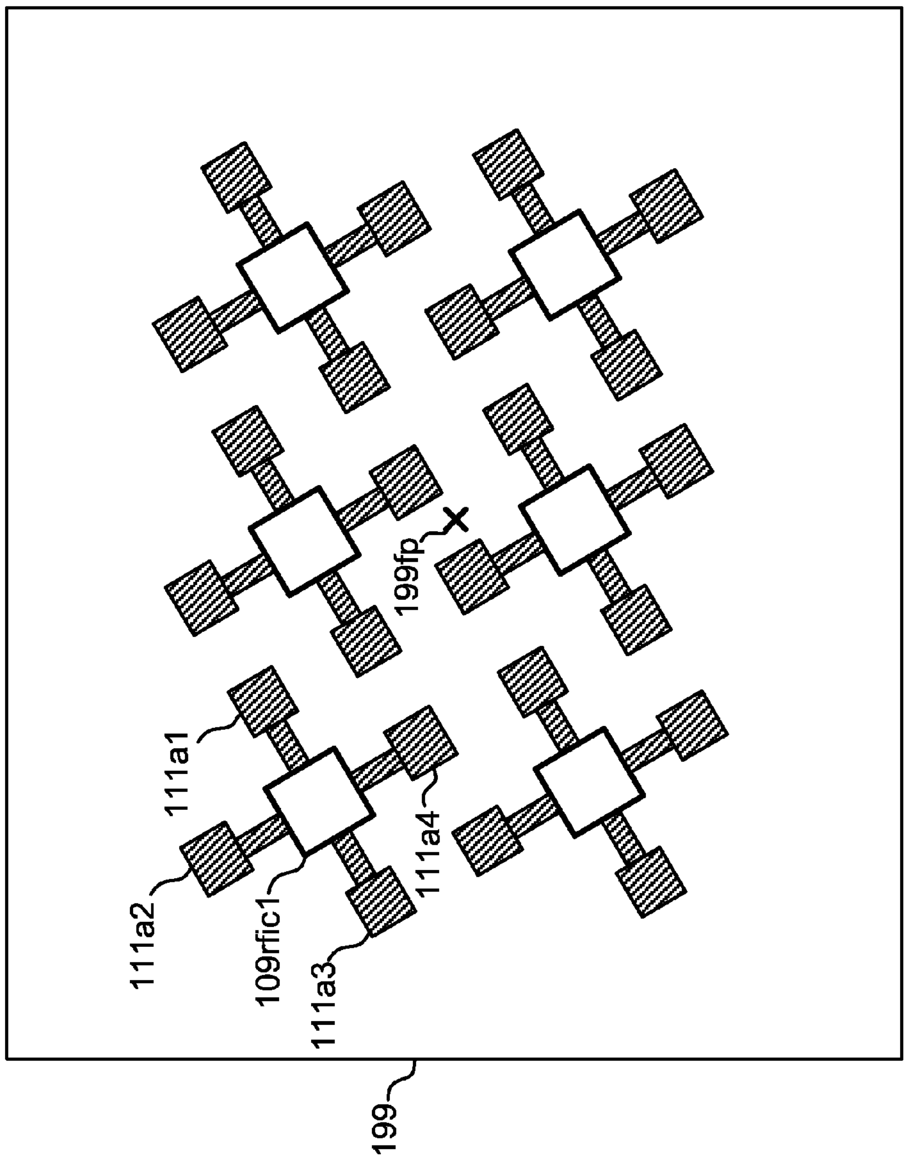
FIG. 2C illustrates one embodiment of a set of antennas on a focal surface of a millimeter-wave focusing element in proximity to various RFICs.

FIGS. 2A, 2B, 2C, and 2A, 2B, 3A, and 3B, inclusive, illustrate various embodiments of antenna and RFIC configurations. There is no limit to the number of possible antenna to RFIC configurations, provided, however, that the system includes at least two RFICs, and that there is at least one antenna located in close proximity to each RFIC. In this sense, "close proximity" means that the RFIC and antenna are located a short distance apart, and that they are connected in some way such as by a transmission line in FIG. 1B, or wire bonding in FIG. 1C, or direct placement in FIG. 1D, or by some other way of allowing the RFIC to convey a signal to the antenna. The alternative embodiments illustrated in FIGS. 2A, 2B, and 2C, are just three of many possible alternative embodiments with the RFICs and the antennas.

FIG. 2A illustrates one embodiment of a set of antennas on a focal surface of a millimeter-wave focusing element in proximity to various RFICs. Six RFICs are shown, and each RFIC is in close proximity to one antenna. These include the pairs RFIC 109*rfic*1 and antenna 111*a*, RFIC 109*rfic*2 and antenna 111*b*, RFIC 109*rifc*3 and antenna 111*c*, RFIC 109*rfic*4 and antenna 111*d*, RFIC 109*rfic*5 and antenna 1113, and RFIC 109*rifc*6 and antenna 111*f*. Each antenna is located on the focal surface 199, and the system operates to select one or more antennas that direct millimeter-wave signals toward the millimeter-wave focusing element 198.

FIG. 2B illustrates one embodiment of a set of antennas on a focal surface of a millimeter-wave focusing element in proximity to various RFICs. Six RFICs are illustrated, all of which are located on the focal surface 199. Here, however, each RFIC is connected in close proximity to two antennas, not one. An example is shown in the upper left of FIG. 2B, in which the first RFIC, 109*rfic*1, is connected in close proximity to both antenna 111*a*1 and antenna 111*a*2. Each antenna, here 111*a*1 and 111*a*2, will direct as millimeter-wave signal toward millimeter-wave focusing element 198. In one embodiment, the system will measure the signals received, determine which of the two signals is better directed to a remote target, and tell the RFIC 109*rfic*1 to transmit radiation energy only to the antenna that generates a signal better directed to said target. The description here for the triplet of elements 109*rfic*1, 111*a*1, and 111*a*2, will apply also to each of the five other triplets of an RFIC and two antennas, illustrated in FIG. 2B.

FIG. 2C illustrates one embodiment of a set of antennas on a focal surface of a millimeter-wave focusing element in proximity to various RFICs. Six RFICs are illustrated, all of which are located on the focal surface 199. Here, however, each RFIC is connected in close proximity to four antennas. An example is shown in the upper left of FIG. 2C, in which the first RFIC, 109*rfic*1, is connected in close proximity to antennas 111*a*1, 111*a*2, 111*a*3, and 111*a*4. Each antenna, here 111*a*1, 111*a*2, 111*a*3, and 111*a*4, may direct a millimeter-wave signal toward the millimeter-wave focusing element 198. In one embodiment, the system will measure the signals received from a remote target, determine which of the four signals is better directed to said remote target, and tell the RFIC 109*rfic*1 to transmit radiation energy only to the antenna that generates a signal best directed to said remote target. The description here for the quintuple of elements 109*rfic*1, 111*a*1, 111*a*2, 111*a*3, and 111*a*4, will apply also to each of the five other quintuples of an RFIC and four antennas, illustrated in FIG. 2C.

FIGS. 3A, 3B, and 3C, inclusive, illustrate various embodiments of a point-to-point communication system 100. Each of these three figures includes a first millimeter-wave transceiver 100*a* that transmits signals, a receiving transceiver 100*b* that receives the signals, and a dish, antenna, or other reception device 201 that is the actual receive of the radiated signal energy. The combination of these three figures illustrates one embodiment by which the system may operate. In FIG. 3A, a particular radiating source has been selected by the system that sends signals through the millimeter-wave focusing element, and then in the correct direction toward the receiver 100*b*. In FIG. 3B, this communication has been disrupted, because of some change. In FIG. 3B, the change illustrated is a change in the orientation of transceiver 100*a*, such that the signal radiated from the same RFIC, and transmitted from the same antenna, as in FIG. 3A, now does not travel in the correct direction toward receiver 100*b*. It is possible that some of the signal energy transmitted by first millimeter-wave transceiver 100*a* is received by receiver 100*b*, but the mis-direction of the transmission means that much of the signal energy from transceiver 100*a* is not received by transceiver 100*b*. Although FIG. 3B shows communication disruption to a repositioning of transceiver 100*a*, it will be understand that the problem could have been caused by a repositioning of transceiver 100*b*, or by a repositioning of both transceivers 100*a* and 100*b*, or by some other blockage which may be either a physical blockage or RF interference such that the direction of the signal transmitted in FIG. 3A is now no longer the correct direction, as shown in FIG. 3B. In FIG. 3C, the system has corrected the problem by permitting transmission of radiation energy from a different RFIC to an antenna located in close proximity, and then having that antenna, different from the antenna in FIGS. 3A and 3B, transmit the signal. The same signal may be transmitted, but the key is that the direction has been changed by selection of a different RFIC and one or more different antennas.

In one embodiment, there is a millimeter-wave communication system 100*a* operative to direct millimeter-wave beams 105*a* and 105*b*. The system 100*a* includes a millimeter-wave focusing element 198 which operates to focus millimeter-wave beams 105*a* and 105*b*. The system 100*a* also includes two or more millimeter-wave antennas 111*a*, 111*b*, which are placed at different locations 108*a* and 108*b* on a focal surface 199 of the millimeter-wave focusing element 198. The system also includes two or more radio-frequency-integrated-circuits ("RFICs") 109*rfic*1 and 109*rfic*2, which are placed in close proximity to the millimeter-wave antennas, such that (i) each of the millimeter-wave antennas has at least one RFIC in close proximity, and (ii) each of the millimeter-wave antennas is operative to receive a millimeter-wave signal from said at least one of the RFICs located in close proximity. In some embodiments, the system 100*a* is operative to (i) select which of the millimeter-wave antennas will transmit a millimeter-wave beam 105*a* or 105*b*, and then (ii) direct to the millimeter-wave antenna selected the millimeter-wave signal from one of RFICs 109*rfic*1 or 109*rfic*2 located in close proximity to the millimeter-wave antenna selected, thereby generating a millimeter-wave beam 105*a* or 105*b* at a direction 105*d*1 or 105*d*2 which is consequent upon said selection.

In one embodiment, there is a method for controlling a direction of a millimeter-wave beam 105*a* or 105*b* in a point-to-point or point-to-multipoint communication system 100. In this embodiment a first millimeter-wave radiating source 109*a* is located at a first location 108*a* on the focal surface 199 of a millimeter-wave focusing element 198. Using this source 109*a*, the system 100 (or 100*a*) transmits a millimeter-wave beam 105*a* to a millimeter-wave focusing element 198, wherein the direction 105*d*1 of the beam 105*a* is determined by the first location 108*a*. Further, the system 100 (or 100*a*) determines a direction for the millimeter-wave beam 105*a* that is expected to best improve the communication performance of the system 100. In this sense, "improve the communication performance" means to increase the signal energy received by a receiver 100*b*, without increasing the transmission power. In this embodiment, the system 100 (or 100*a*) includes multiple radiating sources 109*a*, 109*b*, and potentially other sources, each source located at a different location on the focal surface 199, and the system 100 (or 100*a*) further identifies which of such radiating sources will, when active, transmit the beam 105*b* in a second direction 105*d*2 that is closest to the direction expected to best improve the communication performance of the system 100. In this embodiment, the radiating source 109*b* so identified transmits the beam 105*b* in the second direction 105*d*2, thereby improving the performance of the system 100.

In a first alternative embodiment to the method just described for controlling the direction of a millimeter-wave beam, further each of the first 109*a* and second 109*b* millimeter-wave radiating sources comprises a radio-frequency-integrated-circuit ("RFIC") 109*rfic*1 and 109*rfic*2 respectively.

In a first possible configuration of the first alternative embodiment, each of said RFICs 109*rfic*1 and 109*rfic*2 is mounted on a printed-circuit-board ("PCB") 197, and the PCB 197 is located (i) substantially on the focal surface 199 of the millimeter-wave focusing element 198, or (ii) slightly behind the focal surface 199 of the millimeter-wave focusing element 198.

In one possible variation of the first possible configuration just described each of the millimeter-wave radiating sources 109*a* and 109*b* further comprises a millimeter-wave antenna 111*a* and 111*b*, respectively, which operates to radiate the millimeter-wave beam 105*a* and 105*b*, respectively.

In a first possible implementation of one possible variation just described, each millimeter-wave antenna 111*a* and 111*b* is printed on the PCB 197 in close proximity to the corresponding RFIC 109*rfic*1 and 109*rfic*2, respectively.

In a first possible expression of the first possible implementation just described, each RFIC 109*rfic*1 and 109*rfic*2 is mounted using flip-chip mounting technology, and each RFIC is connected directly to its corresponding millimeter-wave antenna 111*a* and 111*b*, respectively, via a transmission line 112*a* printed on the PCB 197.

In a second possible expression of the first possible implementation just described, each RFIC 109*rfic*1 and 109*rfic*2 is connected to its corresponding millimeter-wave antenna 111*a* and 111*b*, respectively, via a bonding wire 115*a*.

In a second further implementation of one possible variation just described, each RFIC 109*rfic*1 and 109*rfic*2 is operative to convert a base-band signal or an intermediate-frequency signal into a millimeter-wave signal, and this millimeter-wave signal is injected into said millimeter-wave antenna 111*a* and 111*b*, respectively, thereby generating said millimeter-wave beam 105*a* and 105*b*, respectively.

In a third further implementation of one possible variation just described, each of the millimeter-wave antennas 111*a* and 111*b*, is located on top of its corresponding RFIC 109*rfic*1 and 109*rfic*2, respectively, or on top of an enclosure of said RFIC, and each of the millimeter-wave antennas 111*a* and 111*b* faces the millimeter-wave focusing element 198.

In one possible expression of the third further implementation just described, each of the millimeter-wave antennas 111*a* and 111*b* is printed on its corresponding RFIC 109*rfic*1 and 109*rfic*2, respectively.

In a second possible configuration of the first alternative embodiments, the RFICs 109*rfic*1 and 109*rfic*2 are operative to convert a base-band signal or an intermediate-frequency signal into a millimeter-wave signal operative to generate the millimeter-wave beam 105*a* or 105*b*.

In a first possible variation of the second possible configuration just described, the base-band signal or intermediate-frequency signal is delivered to the RFICs 109*rfic*1 and 109*rfic*2, and selection of said first 105*d*1 or second 105*d*2 directions is done by commanding the first 109*rfic*1 or second 109*rfic*2 RFICs, respectively, to start generating the millimeter-wave beams 105*a* and 105*b*, respectively.

In a first further implementation of the first possible variation just described, the base-band signal or intermediate-frequency signal is an analog signal.

In a second further implementation of the first possible variation just described, the base-band signal is a digital signal.

In a second possible variation of the second possible configuration just described, the base-band signal or intermediate-frequency signal is delivered to the first RFIC 109*rfic*1, thereby facilitating selection of the first direction 105*d*1.

In a third possible variation of the second possible configuration just described, the base-band signal or intermediate-frequency signal is delivered to the second RFIC 109*rfic*2, thereby facilitating selection of the second direction 105*d*2.

In a second alternative embodiment to the method described for controlling the direction of a millimeter-wave beam, further each of said first 109*a* and second 109*b* millimeter-wave radiating sources includes an antenna, 111*a* and 111*b*, respectively, printed on a PCB 197, and the PCB 197 is located substantially on the focal surface 109 of the millimeter-wave focusing element 198.

In a third alternative embodiment to the method described for controlling the direction of a millimeter-wave beam, further (i) the millimeter-wave focusing element 198 belongs to a first millimeter-wave transceiver 100*a* of said system 100, and (ii) the millimeter-wave beam 105*a* is used by the first millimeter-wave transceiver 100*a* to communicate with a second millimeter-wave transceiver 100*b* that is part of the system.

In a first possible configuration of the third alternative embodiment, improving performance of the system 100 becomes required or preferred due do undesired movement of the millimeter-wave focusing element 198 relative to the second millimeter-wave transceiver 100*b*, or undesired movement of the second millimeter-wave transceiver 100*b* relative to the millimeter-wave focusing element 198, or undesired movement of both the millimeter-wave focusing element 198 and the second millimeter-wave transceiver 100*b* relative to one another, other physical movement or blockage, or other RF interference.

In one possible variation of first possible configuration just described, the undesired movement is caused by wind.

In a second possible configuration to the third alternative embodiment, improving performance is required or preferred in order to direct the beam 105*a* toward the second millimeter-wave transceiver 100*b* when the first millimeter-wave transceiver 100*a* is initially installed.

In one embodiment, there is a method for directing millimeter-wave beams 105*a* and 105*b*. In this embodiment, a point-to-point or point-to-multipoint communication system 100 determines a direction 105*d*1 to which a millimeter-wave beam 105*a* is to be transmitted. There are multiple millimeter-wave antennas 111*a* to 111*f*, inclusive in system 100*a*, each such antenna placed at a different location on the focal surface 199 of a millimeter-wave focusing element 198. In this embodiment, the system 100 (or 100*a*) identifies of such antennas 111*a*-111*f*, which is best placed relative to a focal point 199*fp* of the millimeter-wave focusing element 198 to facilitate transmission of the beam 105*a* in this direction 105*d*1. There are multiple RFICs in the system, such that every antenna 111*a*-111*f* is located in close proximity to an RFIC. In this embodiment, an RFIC located in close proximity to the identified antenna generates a millimeter-wave signal 105*a* which is sent from the RFIC to the identified antenna, and the identified antenna then transmits the signal toward the identified direction 105*d*1.

In a first alternative embodiment to the method just described for directing millimeter-wave beams, further the first RFIC 109*rfic*1 is uniquely associated with said first millimeter-wave antenna 111*a*, as shown in FIG. 2A. In this sense, "uniquely associated with" means that RFIC 109*rfic*1 is the only RFIC that is connected to antenna 111*a*.

In one possible configuration of the first alternative embodiment just described, each of the millimeter-wave antennas 111*a* to 111*f*, inclusive, is uniquely associated with an RFIC, 109*rfic*1 to 109*rfic*6, respectively, as shown in FIG. 2*a*.

In a second alternative embodiment to the method described for directing millimeter-wave beams, the first RFIC 109*rfic*1 is associated with a first millimeter-wave antenna 111*a*1 and with a second millimeter-wave antenna 111*a*2, where each such antenna is located in close proximity to the first RFIC 109*rfic*1, as shown in FIG. 2A.

In one possible configuration of the second alternative embodiment just described, the method further includes (i) the system 100 (or 100*a*) determines a second direction 105*d*2 via which a millimeter-wave beam 105*a* is to be transmitted, (ii) the system 100 (or 100*a*) identifies which of the millimeter-wave antennas placed at different locations on a focal surface 199*fp* of a millimeter-wave focusing element 198, is best placed relative to a focal point 199*fp* of said millimeter-wave focusing element 198 to facilitate transmission of the millimeter-wave beam 105*a* in the second direction 105*d*2, and (iii) the first RFIC 109*rfic*1 generates a millimeter-wave signal which is delivered to the second millimeter-wave antenna 111*a*2, which then transmits the millimeter-wave beam 105*b* toward the second direction 105*d*2.

In a third alternative embodiment to the method described for directing millimeter-wave beams, further (i) the system 100 (or 100*a*) determines a second direction 105*d*2 via which a millimeter-wave beam 105*a* is to be transmitted, (ii) the system 100 (or 100*a*) identifies a second millimeter-wave antenna 111*b* placed at different locations on a focal surface 199*fp* of a millimeter-wave focusing element 198, which is best placed relative to a focal point 199*fp* of said millimeter-wave focusing element 198 to facilitate transmission of the millimeter-wave beam 105*a* in the second direction 105*d*2, and (iii) the system 100 (or 100*a*) includes a second RFIC 109*rfic*2 located in close proximity to a second millimeter-wave antenna 111*b*, and the second RFIC 109*rfic*2 generates a millimeter-wave signal which is delivered to the second millimeter-wave antenna 111*b*, which then transmits a millimeter-wave beam 105*b* toward the second direction 105*d*2.

Figure 4:
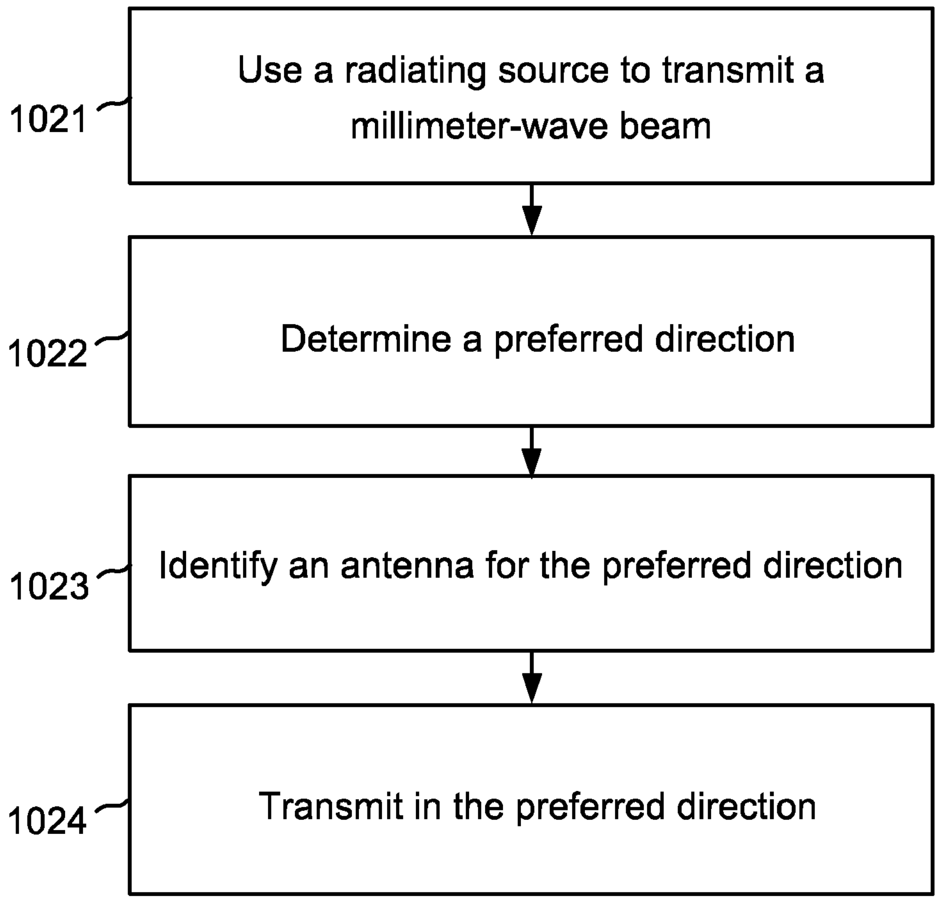
FIG. 4 illustrates a flow diagram describing one method for controlling a direction of a millimeter-wave beam in a point-to-point millimeter-wave communication system.

FIG. 4 illustrates one embodiment of a method for controlling a direction of a millimeter-wave beam 105*a* or 105*b* in a point-to-point or point-to-multipoint communication system 100. In step 1021, using a first millimeter-wave radiating source 109*a* located at a first location 108*a* on a focal surface 199 of a millimeter-wave focusing element 198, to transmit a millimeter-wave beam 105*a* via said millimeter-wave focusing element, wherein said millimeter-wave beam having a first direction 105*d*1 consequent upon the first location. In step 1022, determining a desired direction for the millimeter-wave beam, wherein said desired direction is expected to improve performance of a point-to-point millimeter-wave communication system employing the millimeter-wave beam. In step 1023, identifying, out of a plurality of millimeter-wave radiating sources, a second millimeter-wave radiating source 109*b* located at a second location 108*b* on the focal surface of the millimeter-wave focusing element, which when in use will result in a second direction 105*d*2 for the millimeter-wave beam 105*b* that is closest to the desired direction for the millimeter-wave beam. In step 1024, using the second millimeter-wave radiating source to transmit the millimeter-wave beam 105*b* having the second direction consequent upon the second location, thereby improving performance of the point-to-point millimeter-wave communication system.

Figure 5:
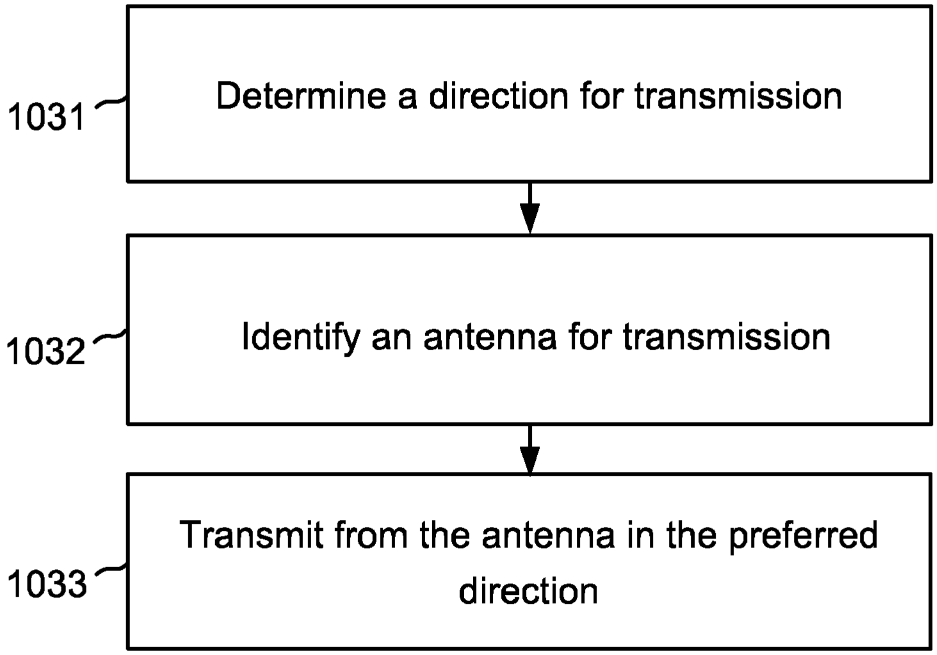
FIG. 5 illustrates a flow diagram describing one method for directing millimeter-wave beams in a point-to-point millimeter-wave communication system.

FIG. 5 illustrates one embodiment of a method for directing millimeter-wave beams 105*a* and 105*b*. In step 1031, determining a direction via which a millimeter-wave beam is to be transmitted. In step 1032, identifying, out of a plurality of millimeter-wave antennas 111*a* to 111*f* placed at different locations on a focal surface 199 of a millimeter-wave focusing element, a first millimeter-wave antenna, 111*a* as an example, which is: best placed, relative to a focal point 199*fp* of said millimeter-wave focusing element, to best facilitate transmission of said millimeter-wave beam via said direction. In step 1033, generating, by a first radio-frequency-integrated-circuit 109*rfic*1 located in close proximity to said first millimeter-wave antenna, a millimeter-wave signal which is delivered to said first millimeter-wave antenna, thereby transmitting said millimeter-wave beam toward said direction.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A method for controlling a direction of a millimeter-wave beam in a point-to-point millimeter-wave communication system, comprising:

using a first millimeter-wave radiating source, located at a first location on a focal surface of a millimeter-wave focusing element, to transmit a millimeter-wave beam via said millimeter-wave focusing element, wherein said millimeter-wave beam having a first direction consequent upon the first location;

determining a desired direction for the millimeter-wave beam, wherein said desired direction is expected to improve performance of a point-to-point millimeter-wave communication system employing the millimeter-wave beam;

identifying, out of a plurality of millimeter-wave radiating sources, a second millimeter-wave radiating source located at a second location on the focal surface of the millimeter-wave focusing element, which when in use will result in a second direction for the millimeter-wave beam that is closest to the desired direction for the millimeter-wave beam; and using the second millimeter-wave radiating source to transmit the millimeter-wave beam having the second direction consequent upon the second location, thereby improving performance of the point-to-point millimeter-wave communication system;

wherein each of said first and second millimeter-wave radiating sources comprises a radio-frequency-integrated-circuit which is mounted on a printed-circuit-board that is located substantially on said focal surface of said millimeter-wave focusing element or slightly behind said focal surface of said millimeter-wave focusing element.

2. The method of claim 1, wherein said each of said first and second millimeter-wave radiating sources further comprises a millimeter-wave antenna operative to radiate said millimeter-wave beam.

3. The method of claim 2, wherein each of said millimeter-wave antennas is printed on said printed-circuit-board, in proximity to one of said radio-frequency-integrated-circuits.

4. The method of claim 3, wherein said radio-frequency-integrated-circuits are mounted using flip-chip mounting technology, and each of said radio-frequency-integrated-circuits is directly connected to one of said millimeter-wave antennas via a transmission line printed on said printed-circuit-board.

5. The method of claim 3, wherein each of said radio-frequency-integrated-circuits is connected to one of said millimeter-wave antennas via a bonding wire.

6. The method of claim 2, wherein each of said radio-frequency-integrated-circuits is operative to convert a base-band signal or an intermediate-frequency signal into a millimeter-wave signal, and said millimeter-wave signal is injected into one of said millimeter-wave antennas which is in proximity to said radio-frequency-integrated-circuit, thereby generating said millimeter-wave beam.

7. The method of claim 2, wherein each of said millimeter-wave antennas is located on top of one of said radio-frequency-integrated-circuits or on top of an enclosure of one of said radio-frequency-integrated-circuits, and each such millimeter-wave antenna is facing said millimeter-wave focusing element.

8. The method of claim 7, wherein each of said millimeter-wave antennas is printed on one of said radio-frequency-integrated-circuits.

9. A method for controlling a direction of a millimeter-wave beam in a point-to-point millimeter-wave communication system, comprising:

using a first millimeter-wave radiating source, located at a first location on a focal surface of a millimeter-wave focusing element, to transmit a millimeter-wave beam via said millimeter-wave focusing element, wherein said millimeter-wave beam having a first direction consequent upon the first location;

determining a desired direction for the millimeter-wave beam, wherein said desired direction is expected to improve performance of a point-to-point millimeter-wave communication system employing the millimeter-wave beam;

identifying, out of a plurality of millimeter-wave radiating sources, a second millimeter-wave radiating source located at a second location on the focal surface of the millimeter-wave focusing element, which when in use will result in a second direction for the millimeter-wave beam that is closest to the desired direction for the millimeter-wave beam; and using the second millimeter-wave radiating source to transmit the millimeter-wave beam having the second direction consequent upon the second location, thereby improving performance of the point-to-point millimeter-wave communication system;

wherein each of said first and second millimeter-wave radiating sources comprises a radio-frequency-integrated-circuit operative to convert a base-band signal or an intermediate-frequency signal into a millimeter-wave signal operative to generate said millimeter-wave beam.

10. The method of claim 9, wherein said base-band signal or intermediate-frequency signal is delivered to said radio-frequency-integrated-circuits, and selection of said first or second directions is done by commanding one of said radio-frequency-integrated-circuits associated with said first or second directions to start generating said millimeter-wave beam.

11. The method of claim 10, wherein said base-band signal or intermediate-frequency signal is an analog signal.

12. The method of claim 10, wherein said base-band signal is a digital signal.

13. The method of claim 9, wherein said base-band signal or intermediate-frequency signal is delivered to one of said radio-frequency-integrated-circuits associated with said first direction, thereby facilitating selection of said first direction.

14. The method of claim 9, wherein said base-band signal or intermediate-frequency signal is delivered to one of said radio-frequency-integrated-circuits associated with said second direction, thereby facilitating selection of said second direction.

15. The method of claim 1, wherein each of said first and second millimeter-wave radiating sources comprises an antenna printed on the printed-circuit-board.

16. The method of claim 1, wherein: (i) said millimeter-wave focusing element belongs to a first millimeter-wave transceiver of said point-to-point millimeter-wave communication system, and (ii) said millimeter-wave beam is used by the first millimeter-wave transceiver to communicate with a second millimeter-wave transceiver belonging to said point-to-point millimeter-wave communication system.

17. The method of claim 16, wherein said improving performance is required due do undesired movement of said millimeter-wave focusing element relative to the second millimeter-wave transceiver.

18. The method of claim 17, wherein said undesired movement is caused by wind.

19. The method of claim 16, wherein said improving performance is required in order to direct said beam toward said second millimeter-wave transceiver when first installing the first millimeter-wave transceiver.

* * * * *